(12) United States Patent
Savich et al.

(10) Patent No.: US 7,591,974 B2
(45) Date of Patent: Sep. 22, 2009

(54) METHODS FOR PRODUCING SUPERABSORBENT POLYMERS FOR USE IN AGRICULTURAL APPLICATIONS

(75) Inventors: Milan H. Savich, Beaverton, OR (US); Rodney L. Forni, Milwaukie, OR (US); William Chambers, Lebanon, OR (US)

(73) Assignee: Absorbent Technologies, Inc., Beaverton, OR (US)

( * ) Notice: Subject to any disclaimer, the term of this patent is extended or adjusted under 35 U.S.C. 154(b) by 0 days.

(21) Appl. No.: 11/657,869

(22) Filed: Jan. 25, 2007

(65) Prior Publication Data

US 2008/0051494 A1   Feb. 28, 2008

Related U.S. Application Data

(60) Provisional application No. 60/762,098, filed on Jan. 25, 2006.

(51) Int. Cl.
*H05B 6/00* (2006.01)
*C08B 31/00* (2006.01)
*C08F 251/00* (2006.01)

(52) U.S. Cl. .................. 264/464; 525/54.31; 525/54.32

(58) Field of Classification Search ................ 264/464; 525/54.31, 54.32
See application file for complete search history.

(56) References Cited

U.S. PATENT DOCUMENTS

| | | | | |
|---|---|---|---|---|
| 3,935,099 | A * | 1/1976 | Weaver et al. ................ | 210/689 |
| 4,076,663 | A | 2/1978 | Masuda et al. ............ | 525/54.31 |
| 4,155,888 | A | 5/1979 | Mooth ......................... | 527/314 |
| 5,350,799 | A | 9/1994 | Woodrum et al. .......... | 525/54.3 |
| 5,523,372 | A * | 6/1996 | Fisk ............................ | 527/313 |
| 5,536,264 | A | 7/1996 | Hsueh et al. ................ | 604/368 |
| 5,821,286 | A | 10/1998 | Xu et al. ........................ | 524/47 |
| 5,925,299 | A | 7/1999 | Dierckes, Jr. et al. ........ | 264/154 |
| 6,800,712 | B2 | 10/2004 | Doane et al. ................. | 527/312 |
| 6,881,792 | B2 | 4/2005 | Harada et al. ............... | 525/198 |
| 6,969,750 | B2 | 11/2005 | Tanaka et al. ................ | 526/262 |
| 2001/0006267 | A1 | 7/2001 | Harada et al. ............... | 264/140 |
| 2002/0039869 | A1 | 4/2002 | Achille ....................... | 442/417 |
| 2004/0087730 | A1 | 5/2004 | Harada et al. ............ | 525/329.7 |
| 2004/0152833 | A1 * | 8/2004 | Doane et al. ............. | 525/54.31 |
| 2004/0214946 | A1 | 10/2004 | Smith et al. ................. | 524/556 |
| 2004/0234607 | A1 | 11/2004 | Irie et al. .................... | 424/486 |

OTHER PUBLICATIONS

"Starch-Encapsulated Pesticides: ARS Papers Presented at the International Seminar on Research and Development of Controlled-Release Formulations of Pesticides". Vienna, Austria Sep. 6-10, 1993 United States Department of Agriculture; Agricultural Service; 1995-1; Nov. 1994.
Office Action mailed on Mar. 19, 2007 in regards to U.S. Appl. No. 11/013,664.
Office Action mailed on Aug. 8, 2007 in regards to U.S. Appl. No. 11/013,664.
Office Action mailed on Mar. 19, 2007 in regard to U.S. Appl. No. 11/500,698.
Office Action mailed on Aug. 2, 2007 in regard to U.S. Appl. No. 11/500,698.
Office Action mailed on Jan. 16, 2007 in regard to U.S. Appl. No. 11/269,214.
Office Action mailed on Sep. 17, 2007 in regard to U.S. Appl. No. 11/269,214.
International Search Report mailed Sep. 12, 2007.

* cited by examiner

*Primary Examiner*—Philip C Tucker
*Assistant Examiner*—Michael N Orlando
(74) *Attorney, Agent, or Firm*—Stoel Rives LLP

(57) ABSTRACT

Methods and systems for producing superabsorbent polymer particles for use in agricultural applications are disclosed. A monomer is graft polymerized onto a starch to form a starch graft copolymer. The moisture content of the starch graft copolymer is reduced through the use of an extruder.

13 Claims, 7 Drawing Sheets

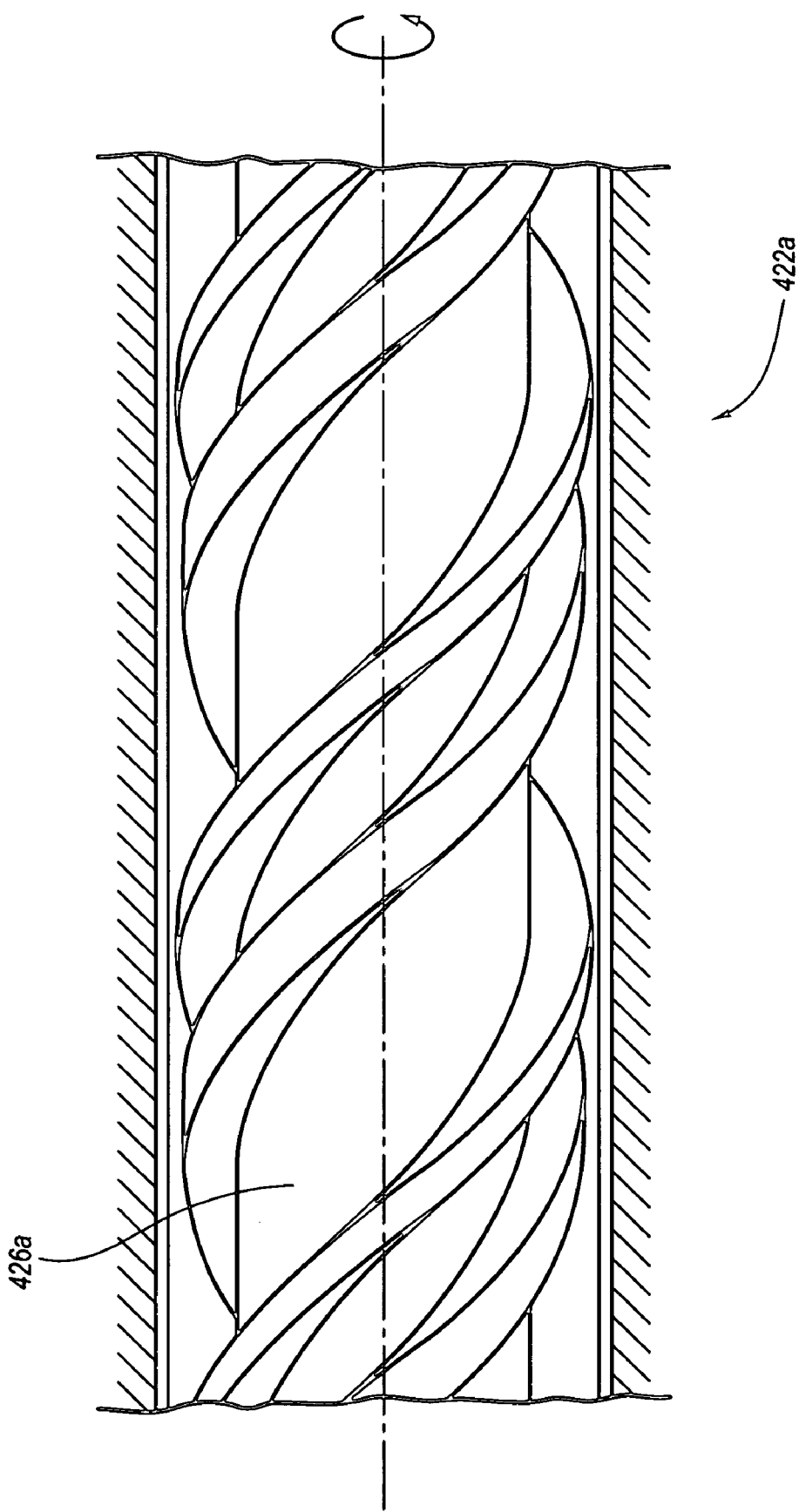

METHODS FOR PRODUCING SUPERABSORBENT POLYMERS FOR USE IN AGRICULTURAL APPLICATIONS

CROSS-REFERENCE TO RELATED APPLICATIONS

This application claims the benefit under 35 U.S.C. § 119(e) of U.S. Provisional Patent Application Ser. No. 60/762,098, filed Jan. 25, 2006, and titled "Improved Drying Methods For Producing Superabsorbent Polymers," which is incorporated herein by reference.

TECHNICAL FIELD

The present disclosure relates to superabsorbent polymer products and to novel methods for producing superabsorbent polymer products.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered to be limiting of the scope of the present disclosure, the embodiments will be described and explained with specificity and detail in reference to the accompanying drawings as provided below.

FIG. 4A is a partially cut away side elevation cross sectional view of one embodiment of a single screw extruder.

DETAILED DESCRIPTION

Figure 1:
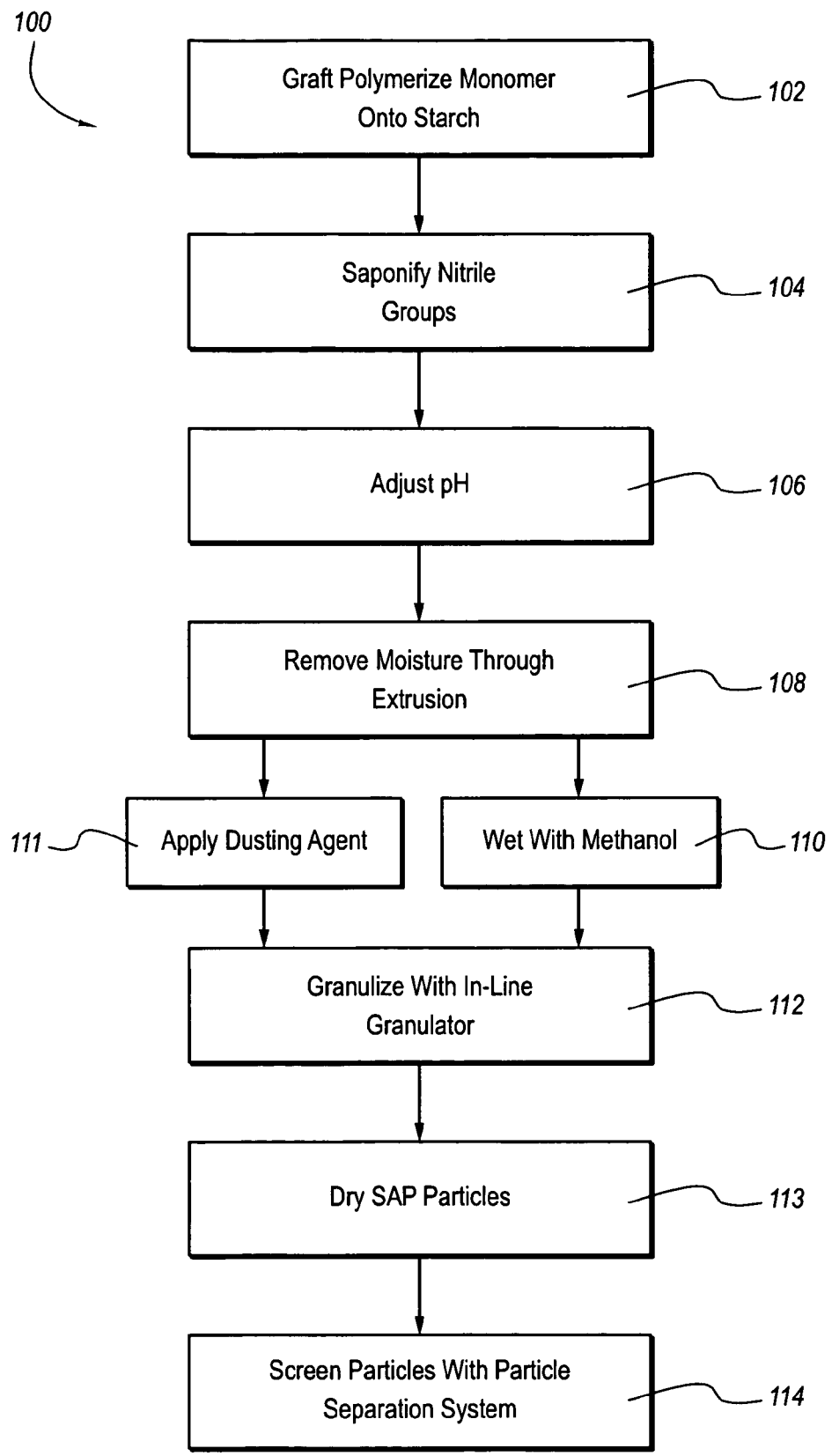
FIG. 1 is a flow diagram illustrating one exemplary embodiment of a method for producing starch graft copolymer superabsorbent polymer products.

Those skilled in the art will recognize that the methods, components and compositions generally disclosed and illustrated in the Figures herein may be arranged and practiced in a wide variety of different configurations, such as without one or more of the specific details described, or with other methods, components, materials, etc. In some cases, well-known materials, components or method steps are not shown or described in detail. Furthermore, the described components, method steps, compositions, etc., may be combined in any suitable manner in one or more embodiments. Thus, the following more detailed description of various embodiments, as disclosed and represented in the Figures, is not intended to limit the scope of the present disclosure, but is merely representative of certain exemplary embodiments. While the various aspects of the embodiments are presented in drawings, the drawings are not necessarily drawn to scale unless specifically indicated.

The phrases "connected to," "coupled to" and "in communication with" refer to any form of interaction between two or more entities, including mechanical, electrical, magnetic, electromagnetic, fluid, and thermal interaction. Two components may be coupled to each other even though they are not in direct contact with each other.

Superabsorbent polymers ("SAPs") are materials that imbibe or absorb at least 10 times their own weight in aqueous fluid and that retain the imbibed or absorbed aqueous fluid under moderate pressure. The imbibed or absorbed aqueous fluid is taken into the molecular structure of the SAP rather than being contained in pores from which the fluid could be eliminated by squeezing. Some SAPs can absorb up to, or more than, 1,000 times their weight in aqueous fluid. In one embodiment, SAPs can absorb between 200 to 600 times their weight in aqueous fluid.

SAPs may be used in agricultural or horticultural applications. The terms "agricultural" and "horticultural" are used synonymously and interchangeably throughout the present disclosure. Applying SAPs to soil in agricultural settings have resulted in earlier seed germination and/or blooming, decreased irrigation requirements, increased propagation, increased crop growth and production, increased crop quality, decreased soil crusting, increased yield and decreased time of emergence.

Synthetic SAPs are commercially available and are conventionally used in conjunction with baby or adult diapers, catamenials, hospital bed pads, cable coating and the like. However synthetic SAPs may also be used in agricultural applications. Another type of SAP product used more widely in agricultural applications includes starch graft copolymers. Starch graft copolymers comprise a monomer graft polymerized onto a polysaccharide, such as a starch or cellulose. Starch graft copolymers are typically used to absorb aqueous fluids for use in absorbent softgoods, in increasing the water holding capacity of soils, and as coatings onto seeds, fibers, clays, and the like.

FIG. 1 is a flow diagram illustrating one exemplary embodiment of a method 100 for producing SAP particles that may be used in agricultural applications. The method 100 illustrated herein provides a method for producing starch graft copolymer SAP particles. However, it should be appreciated that synthetic polymers may also be used when appropriate as understood by one having skill in the art with the aid of the present disclosure.

The method 100 of producing a starch graft copolymer SAP for use in agricultural applications involves graft polymerizing 102 a monomer, such as acrylonitrile, onto a polysaccharide, such as starch, in the presence of an initiator, such as a ceric (+4) salt, to form the starch graft copolymer. Polymerization 102 may be accomplished over several minutes producing long grafted chains of polyacrylonitrile, or polyacrylonitrile combined with other monomers.

Exemplary polysaccharides include cellulose, starches, flours, and meals. Exemplary starches include native starches (e.g., corn starch (Pure Food Powder, manufactured by A.E. Staley), waxy maize starch (Waxy 7350, manufactured by A.E. Staley), wheat starch (Midsol 50, manufactured by Midwest Grain Products), potato starch (Avebe, manufactured by A.E. Staley)), dextrin starches (e.g., Stadex 9, manufactured by A.E. Staley), dextran starches (e.g., Grade 2P, manufactured by Pharmachem Corp.), corn meal, peeled yucca root, unpeeled yucca root, oat flour, banana flour, and tapioca flour. The starch may be gelatinized to provide optimal absorbency. An exemplary starch is gelatinized cornstarch. Furthermore, according to one embodiment, the weight ratio of the starch to the monomer is in the range of between about 1:1 and about 1:6.

Exemplary initiators for graft polymerizing a monomer onto a starch include cerium (+4) salts, such as ceric ammonium nitrate; ammonium persulfate; sodium persulfate; potassium persulfate; ferrous peroxide; ferrous ammonium sulfate-hydrogen peroxide; L-ascorbic acid; and potassium permanganate-ascorbic acid. Other suitable initiators known to those skilled in the art may be used, such as alternative persulfates and peroxides, as well as vanadium, manganese, etc. The amount of initiator used may vary based on the chosen initiator, the selected monomer, and the chosen starch. Some initiators, e.g., persulfates, may require the presence of heat. The initiator may be added in a single or multiple steps, and multiple initiators may be used.

The resulting starch graft copolymer may be saponified 104 with an alkali metal, such as potassium hydroxide or sodium hydroxide, to convert the nitrile groups into a mixture of carboxamides and alkali carboxylates. The saponification step may provide a viscous mass or dough.

In alternative embodiments, a monomer, other than acrylonitrile, may be graft polymerized 102 onto a starch in the presence of an initiator to form a starch graft copolymer. Exemplary alternative monomers include acrylic acid or methacrylic acid. Exemplary monomers may also include acrylamide or methacrylamide. Sulfonic acids, such as 2-acrylamido-2-methyl-propanesulfonic acid (AMPS) and vinyl sulfonic acid may also be used. Moreover, acrylates, such as ethyl acrylate and potassium acrylate may also be used. Derivatives and mixtures of the above-listed monomers may also be desirable.

In applications using acrylic acid, the addition of acrylamide thereto helps induce graft polymerization and adds to the absorbency of the SAP. By way of example, the ratio by weight of acrylic acid to acrylamide may be about 2:1. Alternatively, the ratio of acrylic acid to acrylamide may also range up to a ratio of 9:1 and beyond. Because acrylamide is considered a neurotoxin, it may be desirable to reduce the relative amount of acrylamide to acrylic acid, while using enough to help induce graft polymerization of acrylic acid.

In alternative applications, acrylic acid may graft polymerize onto a starch or other polysaccharide without the assistance of acrylamide. For example, acrylic acid may polymerize when placed under heat and/or pressure. Polymerization without the addition of acrylamide may be accomplished, for example, in a heated screw extruder, such as a single screw or a double screw extruder as will be described herein.

In this alternative embodiment, the monomer may be graft polymerized onto a polysaccharide in the presence of an initiator to form a starch graft copolymer. Exemplary starches and initiators have been described above. The starch graft copolymer may then be cross-linked, for example, by adding a chemical cross-linking agent to form a cross-linked starch graft copolymer. It may be desirable for the starch graft copolymer to be cross-linked if it dissolves in aqueous fluids previous to being cross-linked. Cross-linking is one method to permit the starch graft copolymer to absorb aqueous fluids without dissolving. However, the amount of cross-linking agent added is typically indirectly proportional to the absorbency of the resulting SAP product.

Exemplary cross-linking agents include: glycerides; diepoxides; diglycidyls; cyclohexadiamide; methylene bis-acrylamide; bis-hydroxyalkylamides, such as bis-hydroxypropyl adipamide; formaldehydes, such as urea-formaldehyde and melamine-formaldehyde resins; isocyanates including di- or tri-isocyanates; epoxy resins, typically in the presence of a base catalyst; and derivatives and mixtures thereof.

Alternative methods of cross-linking may also be employed. For example, a solid SAP product may be cross-linked through irradiation, such as through exposure to gamma or x-ray electromagnetic radiation, or to an electron beam and the like. Irradiation facilitates cross-linking of the starch graft copolymer by creating free radicals in the copolymer chain. In some applications, after irradiation an annealing or melting process may be used to re-form the cross-linked copolymer chains. Furthermore, it may be desirable to perform the irradiation process in an atmosphere relatively free of oxygen.

Although the addition of cross-linking agents may be desirable in the production of SAPs, self-cross-linking copolymers may also be used. In a self-cross-linking copolymer, either a single self-reactive functional group or multiple self-reactive functional groups or multiple co-reactive functional groups are incorporated into the mixture. One exemplary co-reactive functional group is a copolymer of acrylic acid and glycidyl methacrylate.

Referring to the exemplary embodiment of FIG. 1, the pH of the starch graft copolymer may be adjusted 106 to a desired value for the particular agricultural application. For example, the starch graft copolymer may be neutralized. Alternative pH values may be desirable depending upon the type of soil and the type of crop the resulting SAPs will be applied to. The resulting pH for most agricultural applications typically will range from about 6.0 to about 8.0. The desired pH may be greater or less than this range depending on the requirements for the particular agricultural application.

Alternatively, in some embodiments, pH adjustment of the starch graft copolymer may occur earlier, such as prior to the cross-linking step summarized in the alternative method described above. In alternative embodiments, pH adjustment may not be necessary. For instance, if potassium acrylate were used as the monomer, the resulting product may already be within an acceptable pH range.

In conventional systems, after the starch graft copolymer is saponified 104, the isolated product is recovered from the viscous polymerization dough with the use of water miscible solvents such as alcohols. Exemplary alcohols for use with this conventional method include methanol, ethanol, propanol and isopropanol. Methanol is typically used to remove water content and the product is subsequently dried.

However, according to the methods of the present disclosure, moisture within the saponified starch-based polymeric dough can be removed 108 through the use of an extruder. Using extrusion technology, the polymerization dough, which may be approximately 80% moisture by weight, can be dried and isolated without the aid of water miscible solvents, such as methanol.

After saponification 104 and optional pH adjustment 106, the polymerization dough may be introduced to an extruder, such as a single screw, double screw or multi-screw extruder. Extrusion technology is known to those having skill in the art, and exemplary extruders that may be used for drying the polymerization dough may be purchased from ENTEK Manufacturing Inc. of Lebanon, Oreg. Exemplary extruders may employ variously sized screw arms, such as screws having a diameter ranging from about 27 mm (or less) to about 133 mm (or more). The barrels within which the extrusion screw(s) auger the polymerization dough may also vary in length, and may range from about 110 mm (or less) to about 510 mm (or more).

In one exemplary embodiment, the polymerization dough having approximately 80% moisture content by weight may be dried to about 40% moisture content by weight after extrusion. Moisture content represents the amount (percentage) of aqueous fluid by weight in the polymerization dough. In another embodiment, the moisture content may be reduced to an amount below about 65% by weight. In yet another embodiment, the moisture content may be reduced to an amount less than or equal to about 40% by weight. All moisture content may be removed via an extruder if desirable. As will be described in greater detail below, the moisture content is dependent upon a number of variables, such as number of barrels, barrel length, temperature, rpm of the extrusion screw(s), number of passes through the extruder and other factors which will be discussed at greater length below.

During the drying process the SAP product may comprise brittle particles because of the application of heat and the resulting loss of moisture. Depending on the aforementioned variables affecting resulting moisture content, the physical characteristics of the SAP product exiting the extruder may vary. The moisture-reduced SAP particles may be discharged by the extruder to be sized and packaged.

Upon exiting the extruder, the moisture-reduced SAP product may be wetted 110 with methanol, or another water-miscible solvent discussed above, to prevent the SAP granules from sticking together. A small amount of methanol may be lightly sprayed on the SAP granules to prevent re-agglomeration of the particles. Alternatively, a dusting agent may be applied 111 to the SAP product to minimize re-agglomeration of the granules. Coating the SAP product with a dusting agent decreases their propensity to stick together. Exemplary dusting agents include cellulose, clay, starch, flour, and other natural or synthetic polymers that prevent the granules from sticking together.

The size of the moisture-reduced SAP product exiting the extruder may be affected by several variables, such as the size of the holes in the die plate, the speed of the extrusion screw, the moisture content of the polymerization dough introduced to the extruder, etc. After passing through the extruder, the SAP product may be introduced to a grinder, chopper or granulator and subsequently granulized 112 or pelletized. The SAP product may also optionally be exposed to water miscible solvents such as alcohol, e.g., methanol. The resulting dough may be immersed into the alcohol, and the alkali starch graft copolymer is precipitated into particles while being granulated. Using the extruder to remove 108 moisture requires less methanol than conventional systems in this optional step.

The moisture-reduced SAP particles may be further dried 113. A dryer may be employed to remove any additional moisture as desired. The dried SAP particles may also be screened 114 based on size through a particle separation or screening system to separate out SAP particles having common mesh sizes. Various particle separation systems may be used as would be apparent to those having skill in the art with the aid of the present disclosure.

Depending on the agricultural application, the final SAP product may have a particle size that is courser than about 300 mesh. For example, in some applications where the starch graft copolymer is applied directly into the soil with the crop, the particle size is courser than about 50 mesh, such as between about 8 to about 25 mesh. This particle size range correlates to commercially available granule applicators. Therefore, alternative particle sizes may be used.

Finer particle sizes are typically used in seed coating or root dipping applications. By way of example, the particle size for seed coating may be between about 75 and about 300 mesh, such as about 100 mesh. For root coating, the particle size may be between about 30 mesh and about 100 mesh, such as about 50 mesh.

By drying the SAP product in an extruder instead of through conventional methods, the environmental problems associated with handling toxic alcohols, such as methanol, are minimized. Furthermore, methanol (and other alcohols) is flammable and may pose a fire hazard. Using extrusion technology instead of methanol to remove moisture from the polymerization dough reduces this hazard. Moreover, methanol is costly to dispense and to purchase. Therefore, drying the SAP product in an extruder also provides a cost savings.

During the process of producing the starch graft copolymer dough, various additives may optionally be included at different stages during production of the SAP product. For example, additives to promote plant growth may be included at some stage of the SAP production process, such as previous to drying, as would be apparent to those having skill in the art with the aid of the present disclosure. One exemplary additive includes fertilizer. Various fertilizers that are commercially available may be included. In some embodiments, controlled-release fertilizers may be used. Alternative or additional additives that may also be included are, without limitation, pesticides, herbicides, fungicides, growth hormones and regulators, mycorrhizal fungi, kelp products, soil-based nutrients and the like.

Exemplary pesticides that may be added include, but are not limited to, acaricides, algicides, antifeedants, avicides, bactericides, bird repellents, chemosterilants, herbicide safeners, insect attractants, insect repellents, insecticides, mammal repellents, mating disruptors, molluscicides, nematicides, plant activators, plant-growth regulators, rodenticides, synergists, and virucides. Exemplary microbial pesticides include bacillus thuringiensis and mycorrhizal fungi. Exemplary insecticides include, but are not limited to, thiodan, diazinon, and malathion.

Exemplary commercially available pesticides include, but are not limited to: Admire™ (imidacloprid) manufactured by Bayer, Regent™ (fipronil) manufactured by BASF, Dursban™ (chlorpyrifos) manufactured by Dow, Cruiser™ (thiamethoxam) manufactured by Syngenta, Karate™ (lambda-cyhalothrin) manufactured by Syngenta, and Decis™ (deltamethrin) manufactured by Bayer. A combination or blend of pesticides may also be used. Alternative pesticides may also be used as would be apparent to those having skill in the art with the aid of the present disclosure.

Fungicides may also be included with the SAP product during or after production. Fungicides may help control or prevent the growth of mold or fungus on the roots, seeds or seedlings thus inhibiting root or seed rot. Exemplary commercially available fungicides include, but are not limited to: Amistar™ (azoxystrobin) manufactured by Syngenta, Folicur™ (tebuconazole) manufactured by Bayer, OPUS™ (epoxiconazole) manufactured by BASF, Dithane™ (mancozeb) manufactured by Dow, Flint™ (trifloxystrobin) manufactured by Bayer, and Ridomil™ (metalaxyl) manufactured by Syngenta. A combination or blend of fungicides may also be used. Alternative fungicides may also be used as would be apparent to those having skill in the art with the aid of the present disclosure.

Exemplary commercially available herbicides that may be added before or after production of the SAP product include, but are not limited to: Roundup™ (glyphosate) manufactured by Monsanto, Gramoxone™ (paraquat) manufactured by Syngenta, Harness™ (acetochlor) manufactured by Monsanto, Prowl™ (pendimethalin) manufactured by BASF, Dual™ (metolachlor) manufactured by Syngenta, and Puma™ (fenoxaprop) manufactured by Bayer. Furthermore, a combination or blend of herbicides may be used. Alternative herbicides may also be used as would be apparent to those having skill in the art with the aid of the present disclosure.

Exemplary commercially available plant-growth regulators that may be optionally added during or after production of the SAP product include, but are not limited to: Ethrel™ (ethephon) manufactured by Bayer, Pix™ (mepiquat) manufactured by BASF, Dropp™ (thidiazuron) manufactured by Bayer, Finish™ (cyclanilide) manufactured by Bayer, and Royal MH™ (maleic hydrazide) manufactured by Crompton. A combination or blend of growth regulators may be used. Furthermore, growth inhibitors, growth retardants, growth stimulants, and derivatives and mixtures thereof may be included. Alternative growth regulators or hormones may also be used as would be apparent to those having skill in the art with the aid of the present disclosure.

Exemplary soil-based nutrients that may also optionally be added during or after production of the SAP product include calcium, magnesium, potassium, phosphorus, boron, zinc, manganese, copper, iron, sulfur, nitrogen, molybdenum, silicon, ammonium phosphate, fish meal, organic compounds and additives, organic based fertilizers derived from plant and animal products and derivatives, blends, and mixtures thereof. More information about exemplary growth-promoting additives can be found in The Farm Chemicals Handbook published by Meister Publishing Company.

Figure 2:
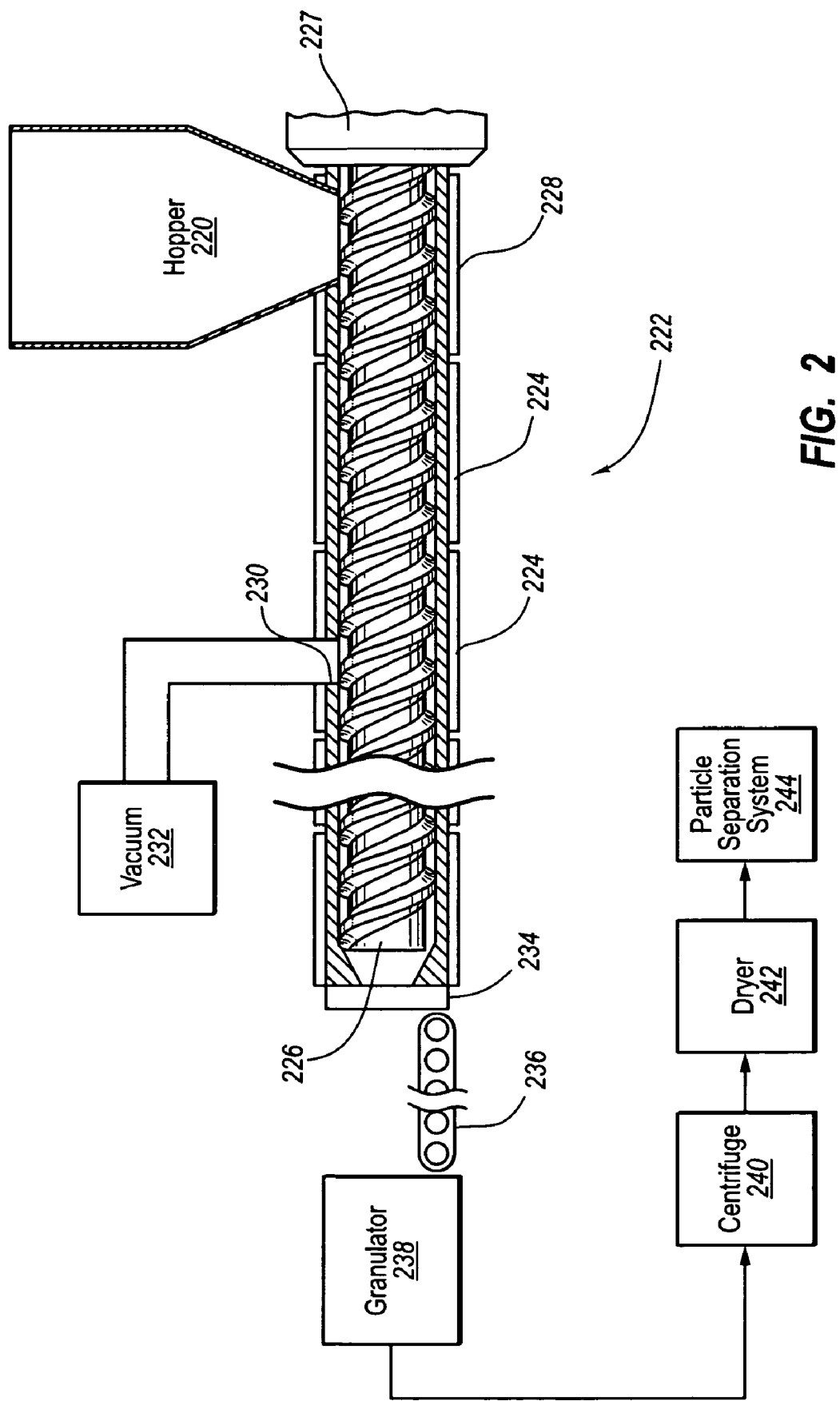
FIG. 2 is a partially cut away side elevation cross sectional view combined with a block view of one embodiment of a system used in the manufacture of superabsorbent polymer products.

FIG. 2 represents one embodiment of an exemplary manufacturing system that may be used with the methods described herein to produce SAP particles. After the starch graft copolymer is saponified and optionally titrated, the viscous polymerization dough is placed in a hopper 220, which feeds the polymerization dough into an extruder 222. In one embodiment, the polymerization dough may be introduced to the extruder 222 via an auger feed leading into a progressive cavity pump.

In one embodiment, the flow of polymerization dough is consistently feed into the extruder 222 via the hopper 220. The hopper 220 may include a pump feeding system such that the polymerization dough enters the extruder 222 under pressure. A pump feeding system may minimize air bubbles, which might otherwise form in the polymerization dough. In one embodiment, the polymerization dough may be under a pressure ranging from 25 psi to about 40 psi. Alternatively, the polymerization dough may be exposed to atmospheric pressure. Alternative pressure levels may be applied as would be apparent to those having skill in the art with the aid of the present disclosure, such as when the extruder speed is varied.

Furthermore, the polymerization dough may be introduced to the extruder 222 at an elevated temperature, such as between about 30° C. and about 100° C., such as about 50° C. The polymerization dough may also be introduced to the extruder 222 at various viscosities. For example, in one embodiment the viscosity of the polymerization dough may range from between 2.5 million centipoise and 0.5 million centipoise. In another embodiment, the viscosity of the polymerization dough entering the extruder 222 may be about 2.0 million centipoise.

The extruder 222 may comprise a series of barrels 224 with at least one extrusion screw 226 disposed axially therein. The extrusion screw 226 may be driven by screw drive motor 227. Since various sizes of extruders 222 may be used, the motor size may also vary. In one embodiment a smaller 5 horsepower motor may be used. In another embodiment a 50 horsepower motor may be used. The type of motor is typically dependent upon the size of the extruder 222. The series of barrels 224 may include a feed barrel 228 that receives the polymerization dough from the hopper 220. The rotation of the extrusion screw 226 causes the polymerization dough to travel down the length of the series of barrels 224.

By way of example, between 8 to 24 barrels 224 may be arranged serially. Alternatively, between 20 to 24 barrels 224 may be arranged serially. In another embodiment, between 16 to 20 barrels 224 may be arranged serially. In yet another embodiment, between 8 to 10 barrels 224 may be arranged serially. It has been found that the greater number of barrels used, the greater the drying effect the extruder 222 has in a single pass. The drying effect is of course dependent upon a number of other variables, such as screw speed, temperature, venting, etc. In an embodiment where fewer barrels 224 are used, the polymerization dough may be passed through the extruder 222 multiple times in order to achieve a desired moisture content. Moreover, more than one extruder 222 may be used in series.

Each barrel 224 provides an environment to the polymerization dough that passes there through. The environment from barrel to barrel may vary. For example, heat may be applied to the polymerization dough while in a given barrel 224 to aid in removing moisture from the dough. Convective heat may be transferred to the dough from heating coils or other heating devices within or adjacent to the barrel walls. Alternatively, a barrel 224 may be cooled to cool the polymerization dough passing there through. Cooling the polymerization dough may be desirable to draw moisture to the outer surface of the dough.

In one embodiment, all barrels, with the exception of the feed barrel 228 are heated. In another embodiment, every four or five barrels 224 are heated, followed by two cooling barrels. Different configurations may be used as desired. In one embodiment, the temperature of a given heating barrel 224 is set at a temperature that ranges from about 50° C. to about 275° C. In another embodiment, the barrels 224 may be set at a temperature ranging from about 50° C. to about 160° C. In yet another embodiment, the barrels 224 may be set at a temperature ranging from about 125° C. to about 150° C. While higher temperatures may dry the polymerization dough more quickly, it has been found that at higher temperatures the polymerization dough may plasticize. Accordingly, in another embodiment the barrels 224 may be set at a temperature of about 130° C. As noted above, however, the temperature settings may vary from barrel to barrel, as desired.

Mechanical heat may also be generated within the barrel of the extruder based on screw configurations. For example, compression screws, reverse elements, shear locks, etc., can all generate mechanical heat that may further aid in removing moisture from the polymerization dough.

Furthermore, multi-stage vacuum chambers and atmospheric vents may also aid in the drying process. In one embodiment, a barrel 224 may include a vent 230, from which moisture may escape the heated extruder 222. A vacuum source 232 may optionally be coupled to vent 230 to apply a negative pressure facilitating the extraction of steam being produced by the heat of the barrels 224. According to one embodiment, approximately half of the barrels 224 may include vents 230, optionally coupled to a vacuum 232.

The speed of the extrusion screw 226 may vary or remain constant during a particular run. In one embodiment, the speed of the extrusion screw 226 may operate between about 20 rpm to about 150 rpm. In another embodiment the speed of the extrusion screw may operate between about 80 rpm and about 150 rpm. In yet another embodiment the speed of the extrusion screw may operate between about 20 rpm and about 30 rpm. In another embodiment the speed of the extrusion screw may operate between about 50 rpm and about 80 rpm.

The speed of the extrusion screw effects the residence time the polymerization dough is spent in each barrel 224.

A die plate 234 may be located at the outlet of the extruder 222 to create a desired size and shape of the SAP product. The die plate 234 may help to maintain desirable size and shape characteristics of the polymerization dough. In one embodiment, the die plate 234 may create rod-shaped forms of the SAP product as the moisture-reduced SAP particles are pushed there through. Various other shapes of SAP product may be used as desirable. Selecting an appropriate die can vary the rod-shaped forms.

The die plate 234 may comprise a plate that has been drilled or formed to contain holes of a particular size and shape. For example, the diameter of the rods may be controlled by the diameter of the holes drilled in the end plate. According to one embodiment, the holes in the end plate may range from between about 1/16 inch to about 1/2 inch in diameter or greater.

The throughput of the polymerization dough out of the extruder 222 may vary. For example, only a few pounds per hour may be passed through the extruder 222, or alternatively thousands of pounds per hour of polymerization dough may pass there through.

The moisture-reduced SAP product may be deposited onto an air-cooled conveyer 236 after passing through the die plate 234. The air-cooled conveyer 236 helps the drying process by drawing moisture from within the polymerization dough to the outer surface. Therefore, subsequent drying methods may be more effective in removing moisture when the moisture has been drawn to the surface. This may be particularly true when the polymerization dough is passed through the extruder 222 for a second time.

As discussed above, before the moisture-reduced SAP product is conveyed to the granulator 238, the SAP product may be wetted with methanol to prevent re-agglomeration of the particles. Alternatively, a dusting agent may be applied to decrease the propensity of the moisture-reduced SAP product to stick together. An in-line granulator 238 may receive the moisture-reduced polymerization dough to granulate the SAP product. The granulated SAP particles may subsequently be centrifuged in a centrifuge 240. Alternatively, the SAP particles may be decanted through decanting technology and methods known to those having skill in the art. A dryer 242 may also be employed to remove additional moisture as desired. In one embodiment, a final moisture content of approximately 12% by weight or less is desirable.

The dried SAP particles made by the above methods may then be passed through a particle separation system 244 such as, for example, a screening system comprising an 8 mesh screen, followed by a 25 mesh screen, followed by a 60 mesh screen, followed by a 100 mesh screen and a fines collection pan. Alternatively and by way of example, particle separation systems sold under the brand ROTEX® may be used.

Figure 3:
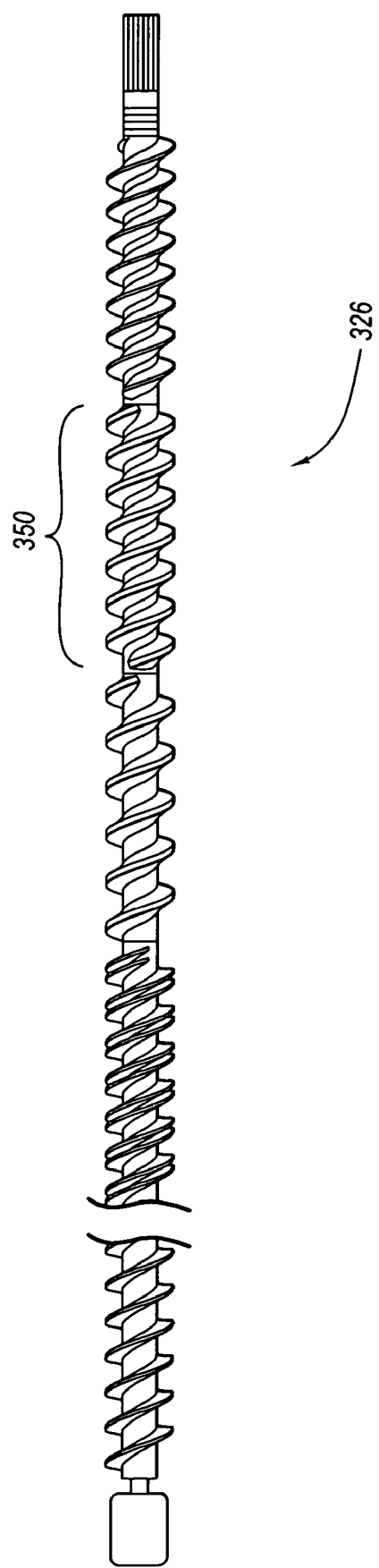
FIG. 3 is a partially cut away side elevation view of various segments of one exemplary embodiment of an extrusion screw.

FIG. 3 shows one exemplary embodiment of an extrusion screw 326 from a partially cut away side elevation view. The extrusion screw 326 may comprise multiple segments 350. Each segment may correspond with a barrel, and may perform a particular function. For instance, the flights of each segment 350 may differ from segment to segment. Alternatively, a single segment may have multiple flights, such that multiple actions may be performed in a single barrel. One exemplary flight may knead the polymerization dough that passes there through. Another flight may facilitate the passage of the dough over a particular time interval, to ensure a particular exposure to a given barrel environment. Yet another flight may chop the polymerization dough into pieces.

Figure 4B:
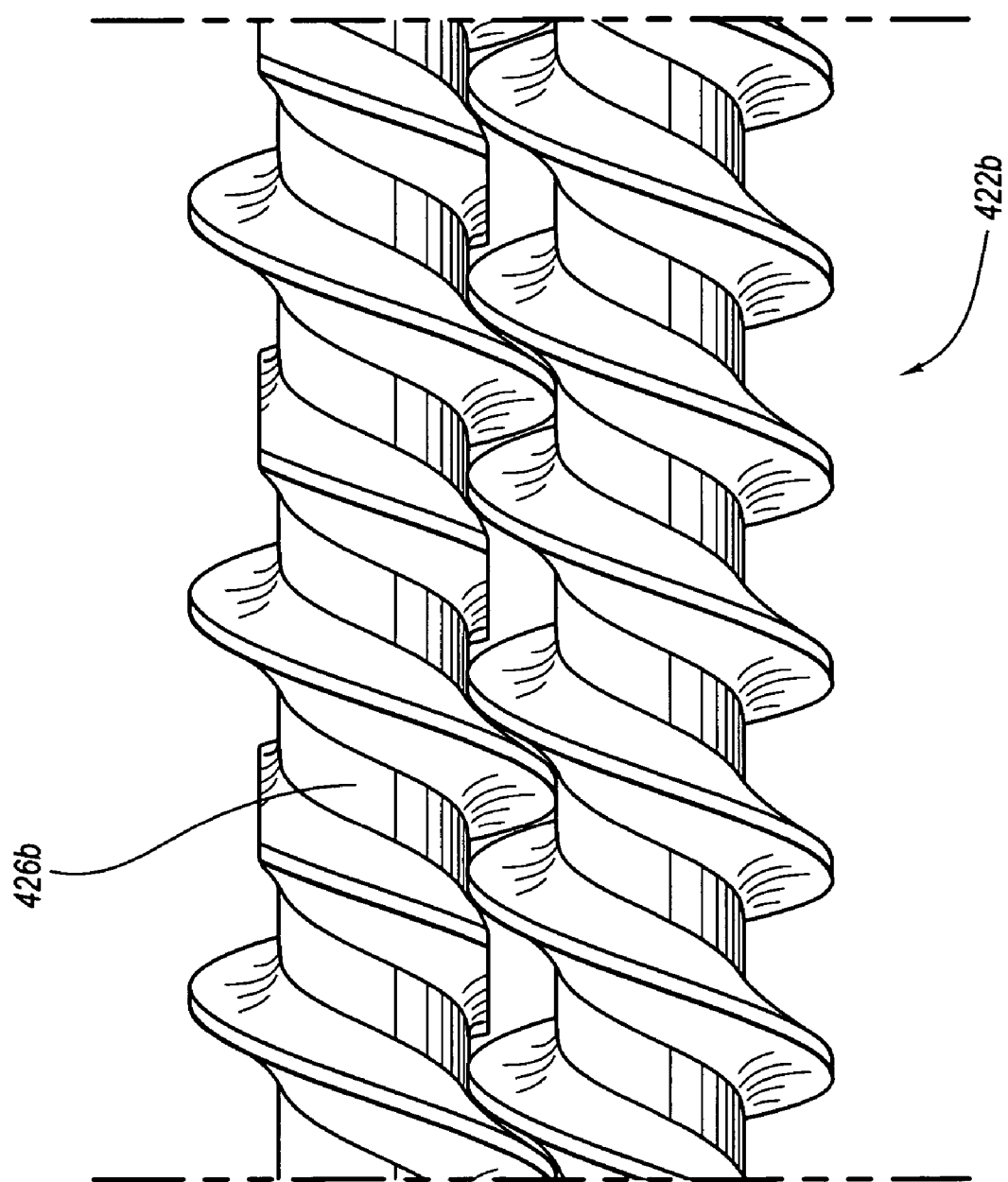
FIG. 4B is a partially cut away side elevation view of one embodiment of a double screw extruder.
Figure 4C:
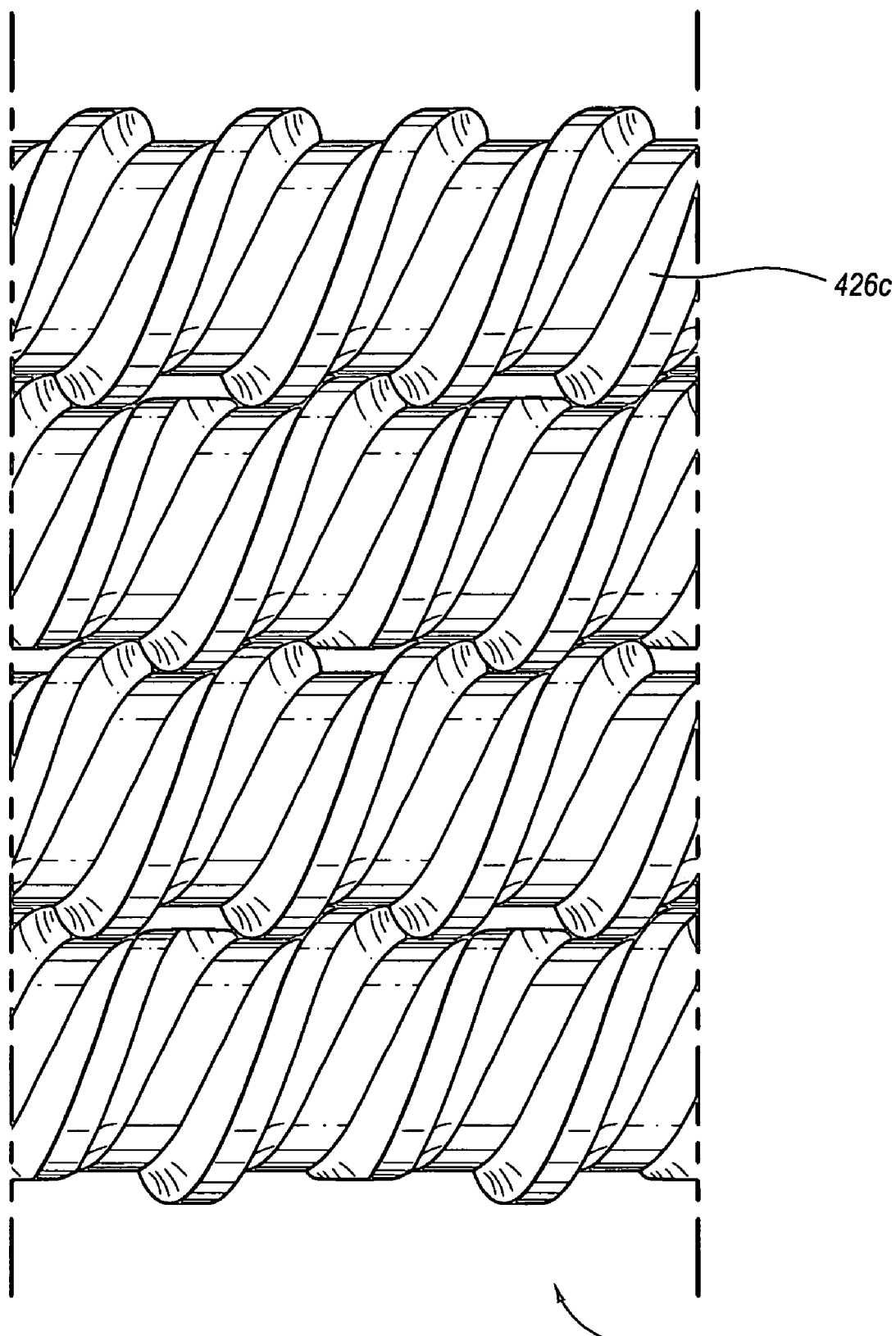
FIG. 4C is a partially cut away side elevation view of one embodiment of a multi-screw extruder.

FIGS. 4A through 4C show various embodiments of heated screw extruders from a partially cut away side elevation view.

FIG. 4A shows one embodiment of an extruder 422a with a single extrusion screw 426a. FIG. 4B illustrates another embodiment of an extruder 422b with a double extrusion screw 426b. With a double screw extruder, the screws intermesh as they turn and the polymerization dough is worked into a continuous dough thereby. FIG. 4C demonstrates a multi-screw extrusion system employing more than two extrusion screws 426c in a single extruder 422c as would be apparent to those having skill in the art with the aid of the present disclosure.

Because the operating parameters and configuration of the extruder is selected to maximize SAP product production and performance in various settings, the configuration and operating parameters may vary greatly. Therefore, the following examples are intended to further illustrate exemplary embodiments, and are not intended to limit the scope of the disclosure.

EXAMPLE 1

A 13-barrel double-screw extruder comprising one feed barrel and twelve heated barrels were used in series. Barrel number 5 along the series included an atmospheric vent. Barrel number 7 included a vent coupled to a vacuum pump. Barrel numbers 9 and 11 also included an atmospheric vent. A pump feeding system was also used to apply greater than atmospheric pressure on the polymerization dough. The polymerization dough was deposited on an air-cooled conveyer upon exiting the extruder. The polymerization dough was subsequently placed back into the feed barrel for an additional pass.

The temperature settings of the barrels were kept constant, and the moisture content was measured after each pass through the extruder. The pressure was varied slightly and the speed of the extrusion screw was varied as detailed in Table 1 below. The initial moisture content of the polymerization dough was approximately 79%. As noted below, only two passes through the extruder resulted in a moisture content of less than 40%.

TABLE 1

| Pass # | Temp. (° C.) | Speed (rpm) | Pressure (psi) | Moisture content |
|---|---|---|---|---|
| 1 | 150 | 80 | 27 | 46.37% |
| 2 | 150 | 80 | 25 | 39.14% |
| 3 | 150 | 30 | 25 | 35.71% |
| 4 | 150 | 30 | 25 | 24.82% |

EXAMPLE 2

A 13-barrel double-screw extruder comprising one feed barrel and twelve heated barrels were used in series. Barrel number 5 along the series included an atmospheric vent. Barrel number 7 included a vent coupled to a vacuum pump. Barrel numbers 9 and 11 also included an atmospheric vent. A pump feeding system was also used to apply greater than atmospheric pressure on the polymerization dough. The polymerization dough was deposited on an air-cooled conveyer upon exiting the extruder. The polymerization dough was subsequently placed back into the feed barrel for an additional pass.

The temperature settings of the barrels were kept constant at 150° C., and the moisture content was measured after each pass through the extruder. The speed of the extrusion screw was also kept constant at 30 rpm. The initial moisture content of the polymerization dough was approximately 82.2%. The results were detailed in Table 2 below.

TABLE 2

| Pass # | Moisture content |
|---|---|
| 1 | 64.82% |
| 2 | 58.76% |
| 3 | 48.73% |
| 4 | 27.30% |
| 5 | 22.72% |

Figure 5A:
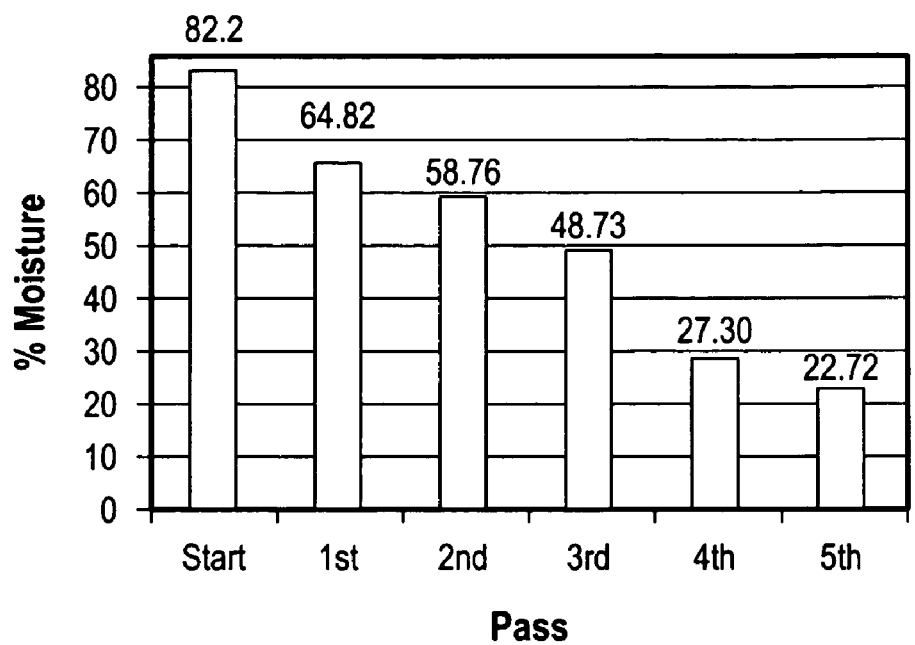
FIG. 5A is a bar graph of moisture content of a superabsorbent polymer dough at various passes through an extruder operating at 30 rpm.

The moisture trend for each pass of the extruder at a temperature of 150° C. and an extrusion screw speed of 30 rpm of Table 2 were plotted in the bar graph shown in FIG. 5A.

EXAMPLE 3

A 13-barrel double-screw extruder comprising one feed barrel and twelve heated barrels were used in series. Barrel number 5 along the series included an atmospheric vent. Barrel number 7 included a vent coupled to a vacuum pump. Barrel numbers 9 and 11 also included an atmospheric vent. A pump feeding system was also used to apply greater than atmospheric pressure on the polymerization dough. The polymerization dough was deposited on an air-cooled conveyer upon exiting the extruder. The polymerization dough was subsequently placed back into the feed barrel for an additional pass.

The temperature settings of the barrels were kept constant at 150° C., and the moisture content was measured after each pass through the extruder. The speed of the extrusion screw was varied between 20 and 25 rpm. The initial moisture content of the polymerization dough was approximately 82.2%. The results were detailed in Table 3 below.

TABLE 3

| Pass # | Moisture content |
|---|---|
| 1 | 62.04% |
| 2 | 55.17% |
| 3 | 43.14% |
| 4 | 28.43% |
| 5 | 34.41% |

Figure 5B:
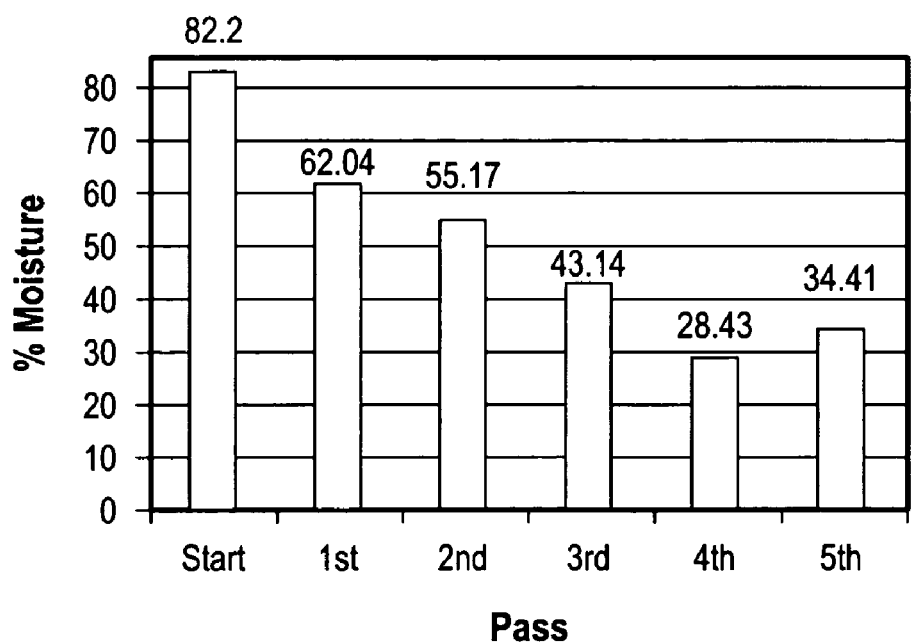
FIG. 5B is a bar graph of moisture content of a superabsorbent polymer dough at various passes through an extruder operating between 20 and 25 rpm.

The moisture trend for each pass of the extruder at a temperature of 150° C. and an extrusion screw speed of between 20 and 25 rpm of Table 3 were plotted in the bar graph shown in FIG. 5B.

It will be obvious to those having skill in the art that many changes may be made to the details of the above-described embodiments. Furthermore, the methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

The invention claimed is:

1. A method of producing a superabsorbent polymer product for use in agricultural applications, comprising:
graft polymerizing a monomer onto a starch in the presence of an initiator to form a starch graft copolymer, the starch graft copolymer forming a polymerization dough;
feeding the polymerization dough into a heated extruder comprising an extrusion screw at a pressure of between 25 psi and 40 psi, the polymerization dough having a viscosity of between 2.5 million centipoise and 0.5 million centipoise when introduced to the heated extruder;
operating the extrusion screw at a speed of between about 20 rpm to about 150 rpm;
reducing the moisture content of the polymerization dough by drying the polymerization dough in the heated extruder, wherein the heated portions of the extruder heat the polymerization dough at a temperature of between 50° C. and 160° C.;
cooling the polymerization dough in such a manner to allow moisture to be drawn to the outer surface of the polymerization dough after exiting the heated extruder; and
drying the polymerization dough a second time after cooling the polymerization dough.

2. The method of claim 1, wherein reducing the moisture content comprises reducing the moisture content of the polymerization dough to less than 65% by weight by drying the polymerization dough in the heated extruder.

3. The method of claim 1, wherein reducing the moisture content comprises reducing the moisture content of the polymerization dough to about 40% by weight or less by drying the polymerization dough in the heated extruder.

4. The method of claim 3, wherein reducing the moisture content of the polymerization dough comprises passing the polymerization dough through the heated extruder multiple times until the moisture content is about 40% by weight or less.

5. The method of claim 1, further comprising:
saponifying the starch graft copolymer before drying the polymerization dough in the heated extruder;
wherein the monomer is at least acrylonitrile.

6. The method of claim 1, further comprising:
adjusting a pH of the starch graft copolymer to between about 6.0 and about 8.0 before drying the polymerization dough in the heated extruder.

7. The method of claim 6, further comprising:
cross-linking the starch graft copolymer;
wherein the monomer is other than acrylonitrile and the monomer is chosen from: acrylic acid, acrylamide, methacrylamide, 2-acrylamido-2-methyl-propane-sulfonic acid, methacrylic acid, vinyl sulfonic acid, ethyl acrylate, potassium acrylate, and derivatives and mixtures thereof.

8. The method of claim 1, further comprising:
supplying an additive to the polymerization dough, wherein the additive is chosen from at least one of the following: fertilizers, herbicides, pesticides, fungicides, and growth regulators.

9. The method of claim 1, wherein reducing the moisture content comprises heating the polymerization dough in the heated extruder at a temperature between about 125° C. and about 150° C.

10. The method of claim 1, wherein the extrusion screw is operated at a speed between about 50 rpm and about 80 rpm.

11. The method of claim 1, wherein the heated extruder comprises at least one vent, the method further comprising:
applying a negative pressure to the at least one vent to facilitate the removal of steam from the heated extruder.

12. The method of claim 1, wherein cooling the polymerization dough further comprises cooling the polymerization dough at an interval within the heated extruder.

13. The method of claim 1, further comprising:
granulating the polymerization dough after the moisture content of the polymerization dough is reduced in the heated extruder.

* * * * *